US009158298B2

(12) United States Patent
Gronbach

(10) Patent No.: US 9,158,298 B2
(45) Date of Patent: Oct. 13, 2015

(54) DEVICE FOR OPERATING AN AUTOMATED MACHINE FOR HANDLING, ASSEMBLING OR MACHINING WORKPIECES

(75) Inventor: Hans Gronbach, Eisenberg (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 635 days.

(21) Appl. No.: 13/464,864

(22) Filed: May 4, 2012

(65) Prior Publication Data

US 2012/0290121 A1    Nov. 15, 2012

(30) Foreign Application Priority Data

May 6, 2011    (DE) .......................... 10 2011 075 467

(51) Int. Cl.
*G06F 19/18*    (2011.01)
*G05B 19/409*    (2006.01)
(Continued)

(52) U.S. Cl.
CPC .............. *G05B 19/409* (2013.01); *G06F 3/013* (2013.01); *G06F 3/017* (2013.01); *G10L 15/22* (2013.01); *G05B 2219/35427* (2013.01);
(Continued)

(58) Field of Classification Search
CPC .................. G05B 19/409; G05B 2219/40398; G05B 2219/35427; G05B 2219/35444; G05B 2219/39441; G10L 15/22; G10L 17/22; G10L 25/21; G10L 2015/223; G06F 3/013; G06F 3/017
USPC ....................... 700/65, 79, 159, 177, 180, 195
See application file for complete search history.

(56) References Cited

U.S. PATENT DOCUMENTS

| 4,462,080 | A | * | 7/1984 | Johnstone et al. ............ 704/200 |
| 4,836,670 | A | | 6/1989 | Hutchinson |

(Continued)

FOREIGN PATENT DOCUMENTS

| DE | 100 26 263 A1 | 3/2001 |
| DE | 100 56 291 A1 | 5/2002 |

(Continued)

OTHER PUBLICATIONS

EP 12 16 6791—Extended European Search Report with English translation, dated Sep. 19, 2014, 19 pages.

(Continued)

*Primary Examiner* — Charles Kasenge
(74) *Attorney, Agent, or Firm* — Blakely Sokoloff Taylor & Zafman LLP

(57) ABSTRACT

A device for operating an automated machine for handling, assembling or machining workpieces, comprising: a display apparatus having a screen for displaying a graphic user interface for controlling and/or monitoring machine functions of the machine, an operating apparatus for inputting command-triggering operator actions for controlling functions of the machine and controlling functions of the graphic user interface, and a controller for implementing input command-triggering operator actions into control commands for controlling functions of the machine and/or functions of the graphic user interface. The operating apparatus comprises an apparatus for inputting manual operator actions and an apparatus for inputting contact-free operator actions. The apparatus for inputting contact-free operator actions includes: a sensor system for detecting contact-free actions of the operator and a detecting unit for picking up a command-triggering operating action of the operator by means of the contact-free operator actions detected by the sensor system.

17 Claims, 4 Drawing Sheets

(51) Int. Cl.
*G06F 3/01* (2006.01)
*G10L 25/21* (2013.01)
*G10L 15/22* (2006.01)
*G10L 17/22* (2013.01)

(52) U.S. Cl.
CPC .............. *G05B 2219/35444* (2013.01); *G05B 2219/39441* (2013.01); *G05B 2219/40398* (2013.01); *G10L 17/22* (2013.01); *G10L 25/21* (2013.01); *G10L 2015/223* (2013.01)

(56) References Cited

U.S. PATENT DOCUMENTS

| | | | |
|---|---|---|---|
| 5,573,006 A | 11/1996 | Shimotani et al. | |
| 6,401,050 B1 | 6/2002 | Cooke et al. | |
| 6,886,137 B2* | 4/2005 | Peck et al. | 715/785 |
| 6,895,380 B2* | 5/2005 | Sepe, Jr. | 704/275 |
| 7,426,876 B2* | 9/2008 | Takaku | 73/862.21 |
| 7,835,498 B2* | 11/2010 | Bonfiglio et al. | 378/115 |
| 8,085,902 B2* | 12/2011 | Bonfiglio et al. | 378/115 |
| 2001/0030630 A1 | 10/2001 | Junk | |
| 2001/0047265 A1* | 11/2001 | Sepe, Jr. | 704/275 |
| 2005/0213036 A1 | 9/2005 | Morse | |
| 2006/0109237 A1 | 5/2006 | Morita et al. | |
| 2007/0027561 A1 | 2/2007 | Dirnfeldner | |
| 2008/0253519 A1* | 10/2008 | Bonfiglio et al. | 378/65 |
| 2009/0198354 A1* | 8/2009 | Wilson | 700/90 |
| 2010/0277411 A1* | 11/2010 | Yee et al. | 345/156 |
| 2011/0026678 A1* | 2/2011 | Bonfiglio et al. | 378/114 |
| 2011/0060423 A1 | 3/2011 | Bonfiglio et al. | 700/11 |
| 2011/0311144 A1* | 12/2011 | Tardif | 382/195 |
| 2012/0195446 A9* | 8/2012 | Abolfathi et al. | 381/151 |
| 2012/0225719 A1* | 9/2012 | Nowozin et al. | 463/36 |

FOREIGN PATENT DOCUMENTS

| | | |
|---|---|---|
| DE | 199 83 513 B4 | 3/2005 |
| DE | 10 2007 058 708 A1 | 6/2008 |
| DE | 10 2009 007 286 A1 | 8/2010 |
| WO | WO 03/065886 A1 | 8/2003 |
| WO | WO 2006/032253 A1 | 3/2006 |

OTHER PUBLICATIONS

Svitil, Kathy, "Pupil Dilation Marks Decision Making," Caltech, Feb. 12, 2008, pp. 1-2.
DE 10 2011 075 467.9—German Examination Report with English translation, issued Apr. 18, 2012, 7 pages.

* cited by examiner

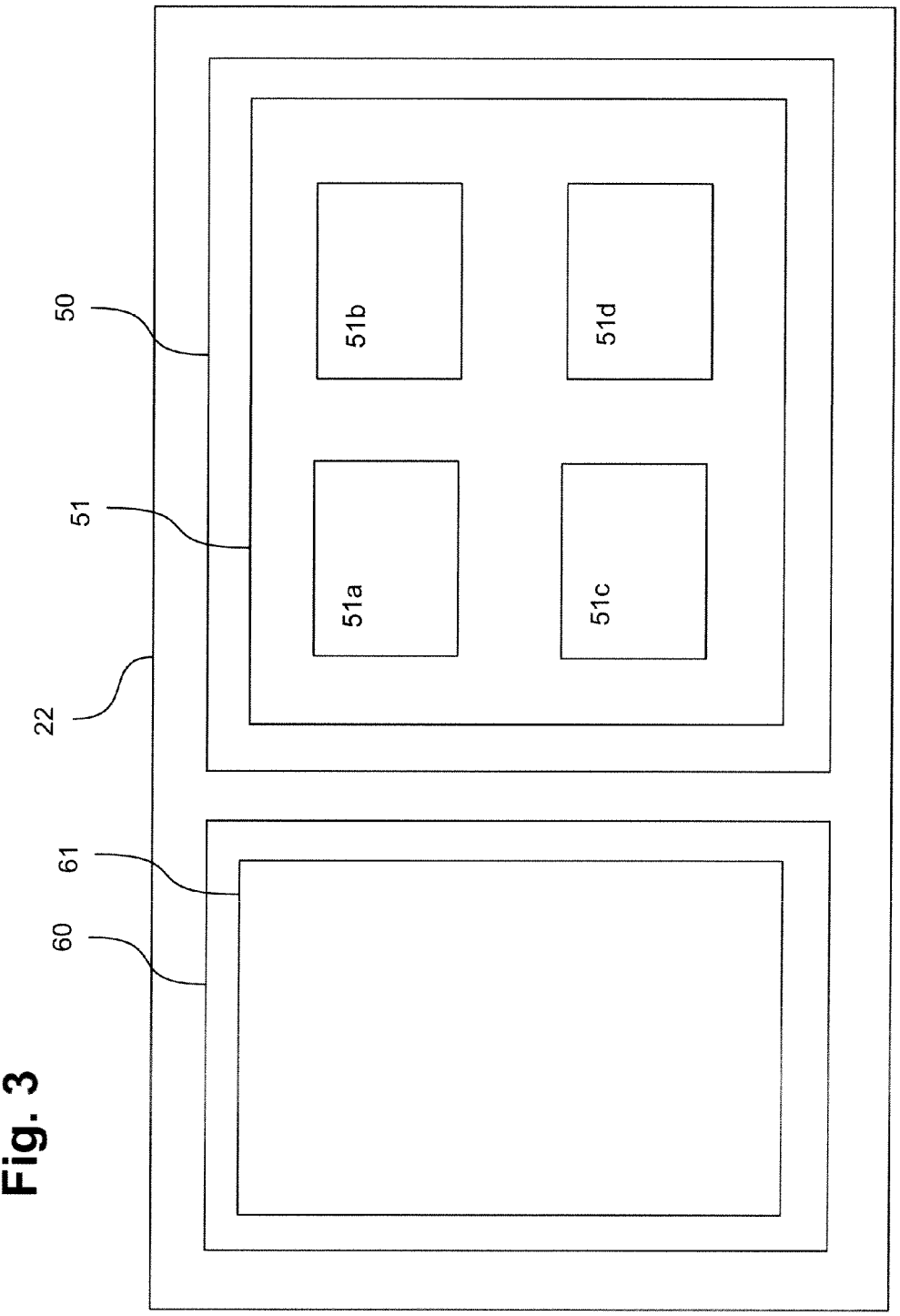

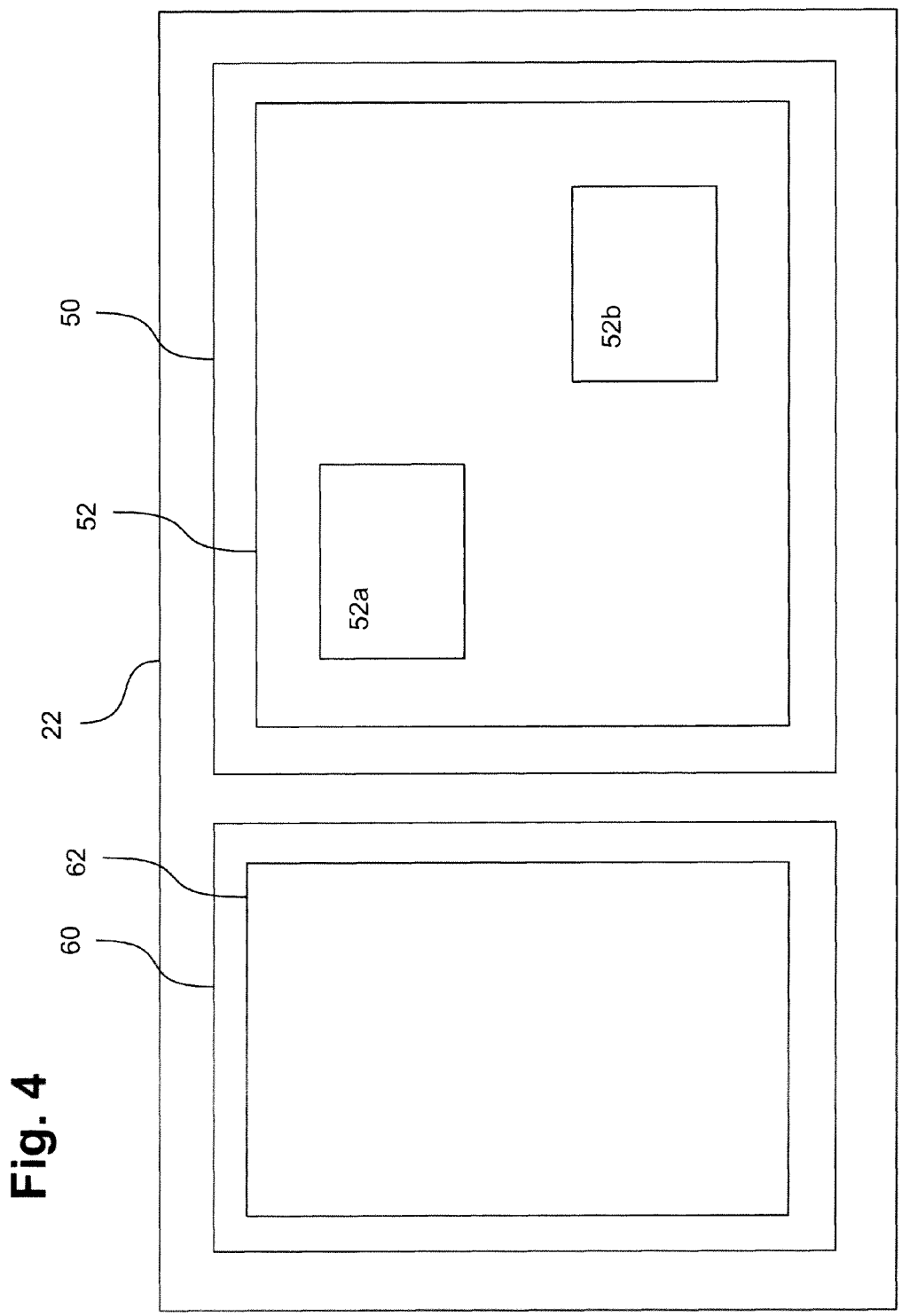

DEVICE FOR OPERATING AN AUTOMATED MACHINE FOR HANDLING, ASSEMBLING OR MACHINING WORKPIECES

CROSS-REFERENCE TO RELATED APPLICATIONS

This application claims priority under 35 U.S.C. §119 to German patent application DE 10 2011 075 467.9, filed 6 May 2011.

DESCRIPTION

The present invention relates to a device for operating an automated machine for handling, assembling or machining workpieces, in particular a numerically controlled machine tool. An embodiment of the operating device comprises a display apparatus including a screen for displaying a graphic user interface for controlling and/or monitoring machine functions of the machine; an operating apparatus for inputting command-triggering operating actions for controlling machine functions of the machine and for controlling functions of the graphic user interface by an operator of the machine; and a controller for implementing input command-triggering operating actions into associated control commands for controlling machine functions of the machine and/or functions of the graphic user interface by the operator.

Furthermore, the present invention relates to an automated machine for handling, assembling or machining workpieces, in particular a numerically controlled machine tool, comprising an above-described device for operating the automated machine.

BACKGROUND

In machine operation or machine control of machines for handling, assembling or machining workpieces known in the prior art, such as numerically controlled machine tools, by using known operating devices an operation by means of purely manual operating actions is provided which are carried out at an operator station of the machine. Here, manually operable operating elements are used, such as alpha-numerical keyboards, further input keys for machine-specific operations, control dials, soft keys, computer mice etc. to communicate instructions to the machine controller.

The feedback of the manual operating actions is output substantially via a graphic user interface on a screen at the operator station, but optionally also via signal lights. Operating actions may be provided for manifold control or monitoring functions of the machine and range from parameter changes to the displacement of the machine axes and switching of machine functions.

Regarding the manual control of numerically controlled automated machines for handling, assembling or machining workpieces by means of an operator station, for example, the SINUMERIK control for CNC machines of the company Siemens is known in the prior art, which provides a software including a graphic user interface that makes it possible to set up operator stations at automated machine for handling, assembling or machining workpieces, for controlling machine functions of the machine and for controlling functions of the graphic user interface by an operator.

In the prior art, operating actions of the operator are performed as follows: the machine operator has an idea of what he or she would like to communicate to the machine controller within the frame of the control or operating function provided by the controller or operating device or what the machine or individual axes and actuators are to do. For example, the operator would like to view certain screen masks of the graphic user interface or he or she would like to command a machining tool, an assembling device, a gripper or the like to move relative to the workpiece. In this course, the operating action is communicated by the operator directly and manually by operating particular operating elements or a sequence of operating elements on a corresponding operating field.

The operating speed depends on how ergonomically the respective operating field has been designed and how adeptly the operator handles it. The switching between various screen masks of the graphic user interface is mostly performed by using so-called soft keys, that is, keys next to the screen, the function of which may change depending on the respective mask, the respective function being shown on the screen directly next to the key.

Before pressing a key of the operating field, the operator will always have to look first where the key to be operated is and whether he or she presses the correct key. In this case, the operation of a control operating field cannot be carried out intuitively and particularly cannot be performed without eye contact with the operating elements.

Furthermore, the problem arises that the operator can only carry out operating actions directly and manually at the operator station of the machine itself. When moving closer to the machine, e.g. for looking into the machining space in the machine, in case of maintenance work in the machining space of the machine or at components of the machine at a distance from the operator station, it is not possible for the operator to carry out operating actions. Even the possibility to be able to trigger an immediate emergency stop at the machine, which is required due to aspects of safety, in occurring dangerous situations where there is danger to man and/or machine, is only possible by directly and manually activating emergency stop switches of the machine. If the operator is not near an emergency stop switch when such situation occurs, the operator will lose valuable time because he or she will have to reach an emergency stop switch first before the required emergency stop can be triggered.

SUMMARY OF THE INVENTION

With regard to the operating devices for operating an automated machine for handling, assembling or machining of workpieces known in the prior art, in which operating actions of the operator are provided that are always merely directly and manually carried out at the operating device of by means of touching an operating element, it is an object of the present invention to improve the operability and operating possibilities on such an operating device in order to enable a more intuitive, flexible, efficient and also safer operation or control of the machine.

For achieving the above-mentioned object, a device according to the independent claims for operating an automated machine for handling, assembling or machining workpieces as well as an automated machine for handling, assembling or machining workpieces that comprises such device are proposed. Dependent claims relate to additional embodiments.

The disclosed embodiments are based on the concept of providing another operating possibility that supplements operability in addition to the manual operation of an operating device known from the prior art for operating an automated machine for handling, assembling or machining workpieces by means of manually executed operating actions of the operator, in which contact-free actions of the operator can be detected and recognized as contact-free operating actions for operating or controlling the machine in order to enable a more intuitive, flexible, efficient and also safer operation or control of the machine.

In this course, contact-free operating actions of the operator may suitably be detected e.g. optically and/or acoustically. Thus, it is possible to provide further contact-free operating possibilities in addition to conventional direct and manual operating possibilities, which make the entire operability or controllability of the machine substantially more intuitive, flexible, efficient and also safer for the operator.

The possibility to combine conventional manual operating possibilities alone as well as additional contact-free operating possibilities allow the operator to be advantageously able to execute the operation and also the control of the machine according to his or her own preferences more flexibly and efficiently. Moreover, the operation by means of contact-free operating actions can be designed to be essentially more intuitive, wherein depending on his or her intuition the operator may additionally carry out either manual operating actions or corresponding contact-free operating actions if this seems to be more intuitive to him or her.

According to the disclosed embodiments, a more efficient and intuitive operation can also be provided because in contrast to manual operating actions before actuation the operator does not first have to search for operating elements that can be manually operated with looks but can directly carry out the contact-free operating actions. At the same time, when executing the respective operating action, he or she can look at information on the graphic user interface which seem to be interesting to him or her, in particular when using the optical recognition of operating actions, such as hand gestures or the detection of acoustic operating actions, or even look into the machining space whereby safety, efficiency and flexibility of the operability can further be increased enormously.

A further advantage may be achieved in that for operating the machine the operator is no longer limited to operating actions to be manually carried out directly at the operator station but that he or she can also carry out operating actions by using the provided contact-free operating possibilities when he or she is not standing directly at the operator station. This may enable the operator in particular to walk away from the position directly located at the operator station when operating the machine, which position is suitable for direct manual operation, in order to optionally obtain a better view on components of the machine or into the machining space and yet be able to still execute contact-free operating actions for operating or controlling the machine. This is particularly suitable for triggering an emergency stop on the machine, which is relevant for safety when a dangerous situation occurs because the operator does not have to reach the next emergency stop switch while losing time but can trigger it directly and promptly in a contact-free manner, if necessary.

Optically detectable contact-free operating actions of the operator comprise pre-defined gestural actions of the operator that can be recognized by means of computer-implemented optical image processing methods that he or she can carry out with one or both hands, and also mimic operating actions of the operator that can be recognized by means of computer-implemented optical image processing methods that he or she can carry out with his or her face. Such mimic operating actions may be realized, for example, by movements of the eyes (e.g. detection of the viewing direction, detection of eyelid movement).

Acoustically detectable contact-free operating actions of the operator comprise pre-defined voice commands that can be recognized by using a computer-implemented voice recognition, however, they may also comprise merely the detection of the loudness of human shouts or screams according to some embodiments, which enables a considerable improvement of the safety at the machine, in particular for operating actions for triggering an emergency stop at the machine, if, for example, an emergency stop is triggered at the machine as soon as a human shout above a loudness limit value and/or of a temporal length beyond a limit value is detected. Thus, an emergency stop may be triggered even if an operator gets into a dangerous situation which requires the triggering of an emergency stop and he or she is at the same time no longer able to reach an emergency stop switch of the machine.

In summary, the disclosed embodiments make it possible to extend the operability of an automated machine for handling, assembling or machining workpieces, such as of a numerically controlled machine tool, and design it to be more efficient, flexible, intuitive and also safer by creating further operating possibilities in addition to the conventionally known direct manual operating possibilities by touching operating elements on an operating device of the machine, which enable the operator of the machine to trigger operating or control commands at the machine by contact-free operating actions.

According to a first aspect, embodiments of a device for operating an automated machine for handling, assembling or machining workpieces is proposed, in particular a device for operating a numerically controlled machine tool, are described.

Embodiments of a device according to the first aspect comprises a display apparatus having a screen for displaying a graphic user interface for controlling and/or monitoring machine functions of the machine, an operating apparatus for inputting command-triggering, particularly manual operating actions for controlling machine functions of the machine and controlling functions of the graphic user interface by an operator of the machine, and a controller for implementing input command-triggering operating actions into associated control commands for controlling machine functions of the machine and/or of functions of the graphic user interface by the operator.

In an embodiment, the operating device comprises an apparatus for inputting manual operating actions and an apparatus for inputting contact-free operating actions. In this case, the means for inputting contact-free operating actions comprises a sensor system for detecting contact-free actions of the operator and a detecting apparatus for detecting a command-triggering operating action of the operator by means of the contact-free actions of the operator detected by the sensor system.

The operating device thus comprises both a conventionally known input apparatus for inputting manual operating actions by touching operating elements, such as operating operational keys of a keyboard, operating a mouse, operating joysticks, soft keys, control dials, switches and/or buttons, and an input apparatus for inputting contact-free operating actions that can be picked up optically and/or acoustically by using a sensor system and detected by using a detecting apparatus. As already described above, this makes it possible to extend the operability of an automated machine for handling, assembling or machining workpieces and design it to be more efficient, flexible, intuitive and even safer.

According to an embodiment, provision is made that the apparatus for inputting contact-free operating actions is adapted to optically detect contact-free operating actions of the operator. This offers the advantage that a very broad range of different actions of the operator can be optically detected by providing a sensor system that can optically detect contact-free physical actions of the operators, wherein these optically detected operating actions can then be evaluated and recognized by using computer-implemented image processing. Such optically detectable actions of an operator can comprise changes of the posture, mimics, gestures as well as any physical movements, such as e.g. arm movements, head movements (e.g. nodding or also shaking the head) of the operator. Here, it is possible by means of electronic and computer-implemented image processing to recognize these operating actions and optionally match them to pre-defined operating actions associated with individual operating commands or operating functions so that they can then be carried out by using the controller.

In this case, the sensor system can include a camera system including at least one camera for optically detecting mimic and/or gestural actions of the operator. Moreover, the detecting apparatus can comprise an image processing unit adapted to perform an image recognition based on sensor signals of the camera system for optically recognizing contact-free operating actions of the operator detected by means of the camera system. In one embodiment, the camera system has at least two cameras disposed spaced apart from one another for optically detecting mimic and/or gestural actions of the operator, the image processing unit being adapted to perform a three-dimensional image recognition based on sensor signals of the camera system.

In recent years, the technical field of optical recognition of optically recognizable actions of a person by means of electronic image processing has made great progress and is being studied, for example, by the Fraunhofer-Institut für Digitale Medien-technologie (Fraunhofer Institute for Digital Media Technology). To this end, the Fraunhofer-Institut für Digitale Medientechnologie has developed methods and technologies which make it possible to perform e.g. an optical eye or pupil detection by means of a camera system wherein an eyelid movement (blinking) as well as the viewing direction of a person can be reliably recognized by using image processing software in cooperation with simple hardware means including a camera system consisting of simple cameras, such as web cams.

Such camera systems already enable three-dimensional image recognition when at least two spaced-apart cameras are used. See e.g. the essay on the system of "Integrated Eye-tracker" on the site www.idmt.fraunhofer.de. According thereto, the described system of an "integrated eyetracker" makes it possible to provide a contact-free and completely calibration-free 3D determination of the viewing direction. By using special miniature cameras, it is possible to install the eye tracking system even in a very small space, information on the viewing direction in real time after each image being possible by using two or more cameras and processing the images at 200 fps. In particular, this eye tracking system enables a recognition accuracy of the viewing direction of less than one degree while the pupil position is determined at an accuracy of more than 1 mm. The distance of the user only depends on the focus range of the used objective, the movement range of the user being hardly restricted because he or she can practically move in the entire visual range of the camera system as long as at least two cameras can capture the eyes.

Starting from the position of the operator panel, the mobility of the user can thus be continuously extended due to the expansion of the camera system by a suitable arrangement of a plurality of cameras and practically be extended to the entire range about the machine to be operated. Thus, the recognition of the viewing direction of the operator is possible on principle in the entire range about the machine to be operated or controlled with simple technical means. Contrary to this, in the case of conventional operating possibilities via a purely manually operable operator panel, the operation is unsuitably limited to the direct manual operation at the position of the operator station.

Regarding the recognition of gestures, the Fraunhofer-Institut für Digitale Medien-technologie also developed a technology designated "GestureID" which makes it possible to optically detect and recognize a user's gestures by means of a simple camera system in cooperation with image processing software. See, e.g. the essay on the system of "GestureID" on the site www.idmt.fraunhofer.de. According thereto, the described system is based on object recognition algorithms that were developed by using detailed studies of human visual perception, wherein pre-processing algorithms filter all necessary information of a predetermined visual scene that localize human gestures and forward this information to a recognition module that analyses the detected gesture and subsequently triggers the reaction linked thereto. In addition, the recognition of gestures is further possible in three-dimensional image processing sensor systems as were recently developed, for example, for the control of a known video game console of the company Microsoft. Such three-dimensional image processing sensor systems in particular enable the detection and recognition of a broad range of contact-free operating actions including changes of the posture, mimics, gestures and any movements of body parts, such as arm movements, head movements (e.g. nodding or shaking the head) of the operator.

In an embodiment, the camera system is adapted to optically capture the eyes of the operator, the image processing unit being adapted to recognize a viewing direction of the operator based on optically captured pupils of the eyes of the operator, for example according to the above-described eye tracking system of the Fraunhofer-Institut für Digitale Medientechnologie (see also WO 03/065886 A1 and WO 2006/032253 A1). This can be used in a particularly advantageous manner, especially for operating or controlling automated machines for handling, assembling or machining workpieces, in particular numerically controlled machine tools, because the recognition of the viewing direction in addition to the recognition of a viewing position on the graphic user interface for the contact-free obtaining of a cursor position for controlling the graphic user interface on such machines can still be used in a wide variety if it is recognized, for example, that the operator directs his or her view to particular machine parts of the machine. Then, for example, this recognition of the viewing direction may be advantageously used to show to the operator monitoring information on the graphic user interface and optionally to furthermore offer control possibilities regarding this viewed component, which may then be triggered by other operating actions, again in particular in a contact-free or also manual manner.

In an embodiment, the image processing unit can be adapted to detect a change of the eye or pupil size in the eyes of the operator. Here, the controller is adapted to trigger an emergency stop at the machine if an abrupt eye or pupil enlargement of an operator is detected. In particular, the controller can be adapted to trigger an emergency stop at the machine if an abrupt eye or pupil enlargement of an operator is detected and simultaneously a viewing direction of the operator is recognized as facing the machining space of the machine. This embodiment offers the advantage that the safety at the machine to be operated for handling, assembling or machining workpieces can be considerably enhanced because a shock of the operator that is triggered by the optical recognition of a dangerous situation (e.g. in the machining space of the machine) and can be recognized by the recognized abrupt eye or pupil enlargement can be converted into a direct command for immediately triggering an emergency stop directly and without any delay (which in case of a purely direct manual operation is naturally caused by a relatively long reaction time until the emergency stop switch is actively actuated by the operator).

In another embodiment, the image processing unit is adapted to detect a viewing position of the operator on the graphic user interface based on the recognized viewing direction. This offers the advantage that the operator can intuitively and efficiently control a cursor or the position of a cursor on the graphic user interface without additionally using his or her hands due the fact that the viewing direction of the user may be used to guide the cursor position on the graphic user interface.

The controller is adapted to select or follow screen portions of the graphic user interface based on the detected viewing direction of the operator on the screen. Thus, it is possible to further improve the control of the graphic user interface on the screen of the operating device because the user can select or follow screen portions of the graphic user interface without additional manual actions while his or her hands remain free for other operating actions.

In an embodiment, the controller is adapted to activate interactive elements of the graphic user interface based on the detected viewing direction of the operator on the screen. Thus, the controller of the graphic user interface on the screen of the operating device can be further improved because the operator can activate interactive elements of the graphic user interface without additional manual actions while his or her hands remain free for other operating actions.

In an embodiment, the controller is adapted to switch between the display of a plurality of screen masks of the graphic user interface based on the detected viewing direction of the operator on the screen. Thus, the controller of the graphic user interface on the screen of the operating device can be further improved because the operator can shift between the display of a plurality of screen masks of the graphic user interface without additional manual actions while his or her hands remain free for other operating actions.

In an embodiment, the image processing unit is adapted to detect a viewing position of the operator to components of the machine in the machining space based on the recognized viewing direction. This embodiment makes it possible apart from or alternatively to the above-described usage of the determination of the viewing position for contact-free control of the graphic user interface to extend the recognition of the viewing position to components of the machine tool.

In an embodiment, the controller is adapted to display information or control masks associated with a component on the graphic user interface based on the detected viewing position of the operator on said component of the machine. In this case it is advantageous that information and/or available control options with regard to the viewed component of the machine can be displayed to the operator on the graphic user interface so that the operator can directly control functions of the component with additional manual or contact-free operating actions without first having to select the component by a preceding cumbersome manual operating action.

In an embodiment, the image processing unit is adapted to recognize an eyelid movement of the operator based on the optically detected eyes of the operator. The detecting apparatus is adapted to detect an eyelid movement pattern on the basis of detected eyelid movements, an eyelid movement pattern comprising a number of eyelid movements and time intervals between eyelid movements, the controller being adapted to allocate a detected predetermined eyelid movement pattern with a predetermined number of eyelid movements in a predetermined time interval to a confirmation control command for confirming a contact-free operating action. This enables the operator in an efficient manner to control simple operating commands only by means of the eyelid movement (blinking), such as operating commands that relate to a simple confirmation or rejection of a previously given command in case of a repeated query by the graphic user interface (which may be required, for example, due to safety reasons). Here, for example, it is possible to predefine or pre-set the association of a one-time, two-time or n-time blinking or a one-time, two-time or n-time eyelid movement within a time interval to be determined with an operating action of a confirmation or rejection of a control function and triggering of a machine function, respectively.

According to another embodiment, the camera system is adapted to optically detect the hands of an operator, the image processing unit being adapted to detect a manual gestural action of the operator. As already described above, such system may be designed according to the gesture recognition system "GestureID" of the Fraunhofer-Institut für Digitale Medientechnologie or also according to a three-dimensional image-recognizing sensor system as has been developed for the control of video game consoles of the company Microsoft. Here, too, the gesture recognition in three-dimensional image-recognizing methods can be ensured as long as the operator keeps the gestural action within the sensor range of the sensor system, for example, as long as the operator and his or her hands, respectively, are within the visual range of at least two cameras of the camera system. Thus, by extending a camera system it is possible to perform the gesture recognition analogously to the detection of the viewing direction in the entire range about the machine to be operated if the cameras of the camera system are arranged such about the machine that each position within the range of the machine to be operated is captured by at least two cameras. However, in the case of conventional operating possibilities via a purely manually operable operator panel the operation is unsuitably restricted to the direct manual operation at the position of the operator station.

In an embodiment, the image processing unit is adapted to recognize gestural commands of a plurality of predefined gestural commands wherein each predefined gestural command is associated with a certain command-triggering operating action. This is an advantage because a plurality of gestural commands can be predefined which can be clearly associated with certain command-triggering operating actions that the operator only has to learn in order to be able to revert to the additional possibility of an operation by contact-free gesture recognition. If the operator wants to give a certain control or operating command, he or she merely has to execute the operating action triggering the control or operating command within the visual range of the camera system with one or both hands, that is, carry out the gesture allotted to this command. Here, many diverse gestures are possible, from making a first to raising a thumb, in particular it is even conceivable to predetermine numeral values by using gestural operating actions by showing the digits of the number to be entered (for example for selecting tools or workpieces to be exchanged or the like) by using one's fingers wherein the number of the lifted fingers (from one finger up to ten fingers) of one or two hands shows the digits between 1 and 10 or 0 and 9. Holding up one's arms or hands can also be defined as a command-triggering operating action, e.g. holding up both one's arms (a clear gesture) may be used for immediately triggering an emergency stop at the machine. In particular in camera systems which cover the entire range about the machine to be operated with simple means, an emergency stop may be triggered immediately and directly from any position about the machine so that it is not necessary to reach the next emergency stop switch as in the case of conventional operating devices. Thus, it is possible to considerably improve the safety at the machines.

According to another embodiment, provision is made that the device for entering contact-free operating actions is adapted to acoustically detect contact-free operating actions of the operator. In this case, the sensor system has a microphone system for detecting acoustic actions of the operator. Thus, the operating possibilities on the machine to be operated can be considerably improved and designed to be substantially more efficient, intuitive and flexible. In particular when implementing voice recognition as can today already be reliably used for the control of navigation systems in motor vehicles, advantages result because the control by using voice commands offers one of the most intuitive control methods. Here, many machine functions or operating functions on the machine can be allotted to unambiguous voice commands that the operator has to say aloud. When a plurality of microphones are suitably used, such verbal operating actions may advantageously be carried out in the entire range about the machine to give function-triggering commands.

An embodiment again results in connection with the immediate triggering of an emergency stop in a dangerous situation, if, for example, by speaking the voice command "EMERGENCY STOP" in the entire range detected by the microphone system an immediate emergency stop can be triggered on the machine without first having to reach the next emergency stop switch to be operated manually.

In an embodiment, the detecting apparatus has a voice recognition unit for recognizing speech input of the operator detected by the microphone system. The voice recognition unit is adapted to detect voice commands of the operator from a plurality of predefined voice commands, each predefined voice command being associated with a certain command-triggering operating action. As described above, this makes it possible to define a plurality of voice commands, including "YES", "NO", "TOOL CHANGE", "ON" or "START OPERATION" and/or "EMERGENCY STOP" in the operator's language that trigger particular corresponding commands. Furthermore, for selecting or controlling components of the machine it is advantageously conceivable to directly implement such components as a voice command by their designation, such as "X AXIS", "Y AXIS", "Z AXIS", "A AXIS", "B AXIS", "TOOL CHANGER", "PALLET", "DOOR", "CHIP CONVEYOR", "ROTARY TABLE", "SPINDLE", and the like.

In an embodiment, the voice recognition unit is adapted to detect a speech pattern of a voice command detected by means of the microphone system, the controller being adapted to log on an operator with an associated stored speech pattern to the machine and perform only detected voice commands that have a detected speech pattern corresponding to the speech pattern associated with the logged-on operator. This makes is possible to carry out only voice commands of an operator actually logged onto the machine for the operation (and thus authorized for control) wherein voice commands or shouts of another person (e.g. of an operator at an adjacently disposed machine) may be ignored if it is recognized that the speech pattern of a is recognized voice command does not match the speech pattern of a logged-on operator of the machine. Thus, any erroneous executions of voice commands that are not intended for the operation of the machine to be operated can be avoided.

In an embodiment, the detecting apparatus is adapted to detect a shout or acoustic scream of the operator and the loudness thereof captured by the microphone system, the controller being adapted to trigger an emergency stop on the machine if a shout or acoustic scream of the operator with a loudness greater than a predetermined loudness limit value is detected by the detecting apparatus. Thereby, safety at the machine can further be improved considerably because this offers another possibility to be able to trigger an immediate emergency stop when a dangerous situation occurs at the machine without having first to reach a manually operated emergency stop switch. This embodiment is usable for situations where the occurring dangerous situation leads or may lead to the operator being injured (e.g. if the latter is caught in a component of the still working machine with body parts or clothing) and the operator cannot reach a manually operated emergency stop switch on his or her own although the emergency stop is urgently required at once in order to avoid injuries or further injuries of the operator or other persons involved. According to this embodiment, it will then be possible to trigger an immediate emergency stop on the basis of an acoustically detected shout or scream, for example, if it exceeds a predetermined loudness or a predetermined temporal length (e.g. also triggered by the start of screams of pain if the operator is hurt, which primarily are not intended to trigger an emergency stop, which, however urgently suggest to trigger an immediate emergency stop).

According to a further embodiment, the input apparatus for the contact-free input of operating commands is adapted to be calibrated to a respective operator in a person-related manner, the input apparatus having a data interface for importing person-related calibration data so that the calibration to the operator is performed based on the person-related calibration data. As already described above, in most image recognition methods and voice recognition methods it is often not required to adapted or calibrate the same to the individual operator. However, in some cases it may still be advantageous to perform an operator-specific calibration, for example, for optimizing a recognition of the viewing direction by inputting or transmitting the operator's height to the image processing unit or for optimizing voice recognition, as described above, by inputting or transmitting an individual speech pattern of a logged-on operator to the voice recognition unit. To this end, it is advantageous if the calibration does not have to be performed again every time an operator is logged on or the machine is started but person-related calibration data is automatically imported when the operator is logged on or the machine is started to be able to carry out the calibration in a more efficient and time-saving manner. The calibration data in this case can comprise a speech pattern associated with the operator for calibrating a voice recognition unit and/or body dimension data associated with the operator for calibrating an image processing unit.

For this purpose, the above described features of the embodiments of the operating device may be used individually or also in combination, wherein the operability may be designed synergistically upon combination of different contact-free operating possibilities to be even more intuitive, efficient and safer. If the operator wants to forgo one or more of the contact-free operating possibilities because of personal preferences, it may of course be provided that said one or more contact-free operating possibilities are each temporarily deactivated individually or in combination. Thus, it can be ensured that the operator may choose whether to use acoustically detectable contact-free operating possibilities (for example based on the possibility of activating or deactivating the voice recognition) and/or to use optically detectable contact-free operating possibilities (e.g. based on the possibility of activating or deactivating image processing, recognition of the viewing direction, viewing position recognition and/or gesture recognition).

According to a second aspect, embodiments of an automated machine for handling, assembling or machining workpieces can be provided, comprising a device for operating an automated machine for handling, assembling or machining workpieces according to one or more of the above-described embodiments of the first aspect of the invention. Substantially the same possibilities, embodiments and advantages in association therewith result as have already been described respectively above in connection with embodiments of an operating device.

According to an embodiment the machine is a numerically controlled machine tool for machining a workpiece. The device for operation can be connected to a numerical control of the machine tool, such as a programmable logic control (PLC control) of the machine tool and/or a numerical control (NC control) of the machine tool. Furthermore, the device for operation in an embodiment may be directly connected to an emergency stop control circuit of the machine tool.

The machine functions of the machine tool controllable by means of the device can comprise at least one of: starting the machine tool, configuring the machine tool, setting up the machine tool, zero point setting, rescue functions, activating the emergency stop of the machine tool, diagnostic fault-finding, maintenance, program management, tool handling, palette handling, tool insertion, tool calibration, tool change, NC control functions including activating and controlling NC axes and actuators of the machine tool and/or programming the numerical control.

In summary, the disclosed embodiments make it possible to extend the operability of an automated machine for handling, assembling or machining workpieces such as a numerically controlled machine tool and design it to be more efficient, flexible, intuitive and also safer by providing further operating possibilities in addition to the conventionally known direct manual operating possibilities by touching operating elements on an operating device of the machine, which enable the operator of the machine to trigger operating or control commands on the machine by contact-free operating actions.

The above-mentioned and further advantageous aspects and embodiments will be described below with reference to the accompanying figures and embodiments.

BRIEF DESCRIPTION OF THE FIGURES

FIG. 3 shows an input apparatus for inputting contact-free operating actions according to first and second embodiments.

FIG. 4 shows an input apparatus for inputting contact-free operating actions according to a third embodiment.

DETAILED DESCRIPTION OF THE EMBODIMENTS

Figure 1:
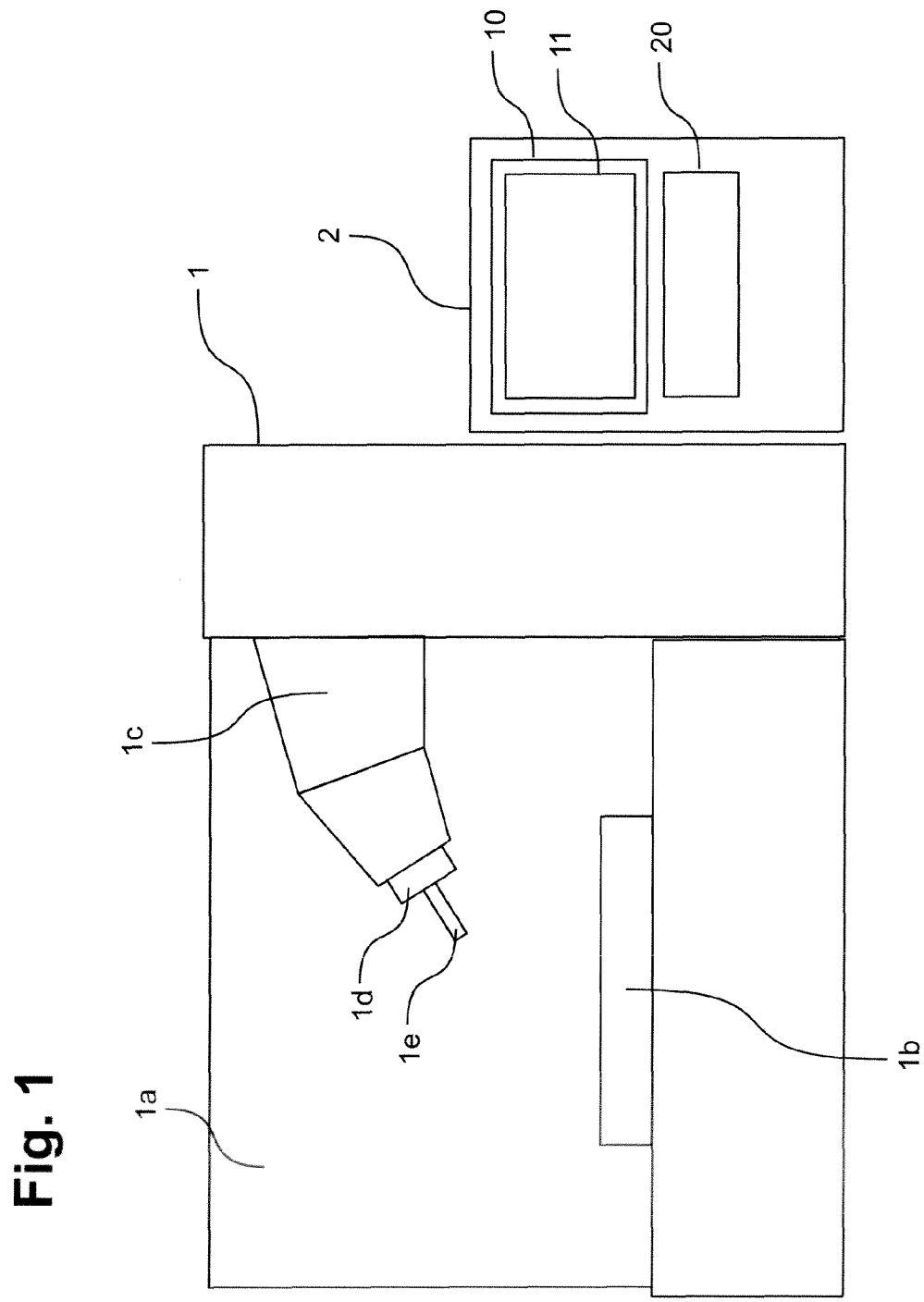
FIG. 1 shows an embodiment of numerically controlled milling machine for milling a workpiece including an operating device for operating and controlling the milling machine.

Embodiments of the present invention are described in detail below by using the enclosed figures. However, the present invention is not limited to the described embodiments. Rather, the present invention is to be stated by the scope of the claims. Equal and/or similar features in the figures and embodiments are denoted by the same reference numbers. A list of the reference numerals used is stated at the end of the description.

FIG. 1 shows an embodiment of a numerically controlled milling machine 1 for milling a workpiece including a device 2 for operating and controlling the milling machine 1 (for short, the device will be referred to in the following as the operating device 2). However, the invention is not limited to operating devices for milling machines as in the present embodiment but can rather be used for the operation of other numerically controlled machine tools, such as milling machines, drilling machines, milling/drilling machine tools, universal milling machines, machining centers, turning lathes, automatic lathes, etc. Furthermore, the invention may advantageously be used for the operation of a large variety of automated machines for handling, assembling or machining workpieces from production and manufacture.

In the present embodiment according to FIG. 1 the milling machine 1 comprises a rotary table 1b disposed on a machine bed inside a machining space 1a for clamping a workpiece to be machined by means of the milling tool 1e which is held in a work spindle 1d of the milling machine 1. The work spindle 1d is arranged on a spindle head 1c of the milling machine, which is attached to a machine stand of the milling machine 1 so as to be displaceable. A workpiece to be machined on the rotary table 1b can be moved relatively to the tool 1e by means of a plurality of CNC controlled linear and/or rotary axes, for example by means of 5 numerically controlled axes.

In analogy to conventionally known operating devices (e.g. operating devices that are set up with the SINUMERIK machine control and operating software) the operating device 2 makes it possible to control controllable machine functions of the machine tool 1. Depending on the design of the machine, these controllable machine functions may comprise: starting the machine tool, configuring the machine tool, setting up the machine tool, zero point setting, rescue functions, activating the emergency stop of the machine tool, diagnostic fault-finding, maintenance, program management, tool handling, palette handling, tool insertion, tool calibration, tool change, NC control functions including activating and controlling NC axes and actuators of the machine tool and/or programming the numerical control. To this end, the operating device is connected to a numerical control (e.g. CNC controller) of the machine tool 1. Furthermore, the operating device may also be connected to a memory programmable control (SPS and PLC, respectively) and/or an emergency stop control circuit of the machine tool 1.

The operating device 2 according to FIG. 1 externally visibly comprises a display apparatus 10 including a screen 11 for displaying a graphic user interface for controlling and supervising machine functions of the machine 1 and an operating apparatus 20 for inputting command-triggering operating actions for controlling machine functions of the machine 1 and functions of the graphic user interface by an operator of the machine 1.

Figure 2:
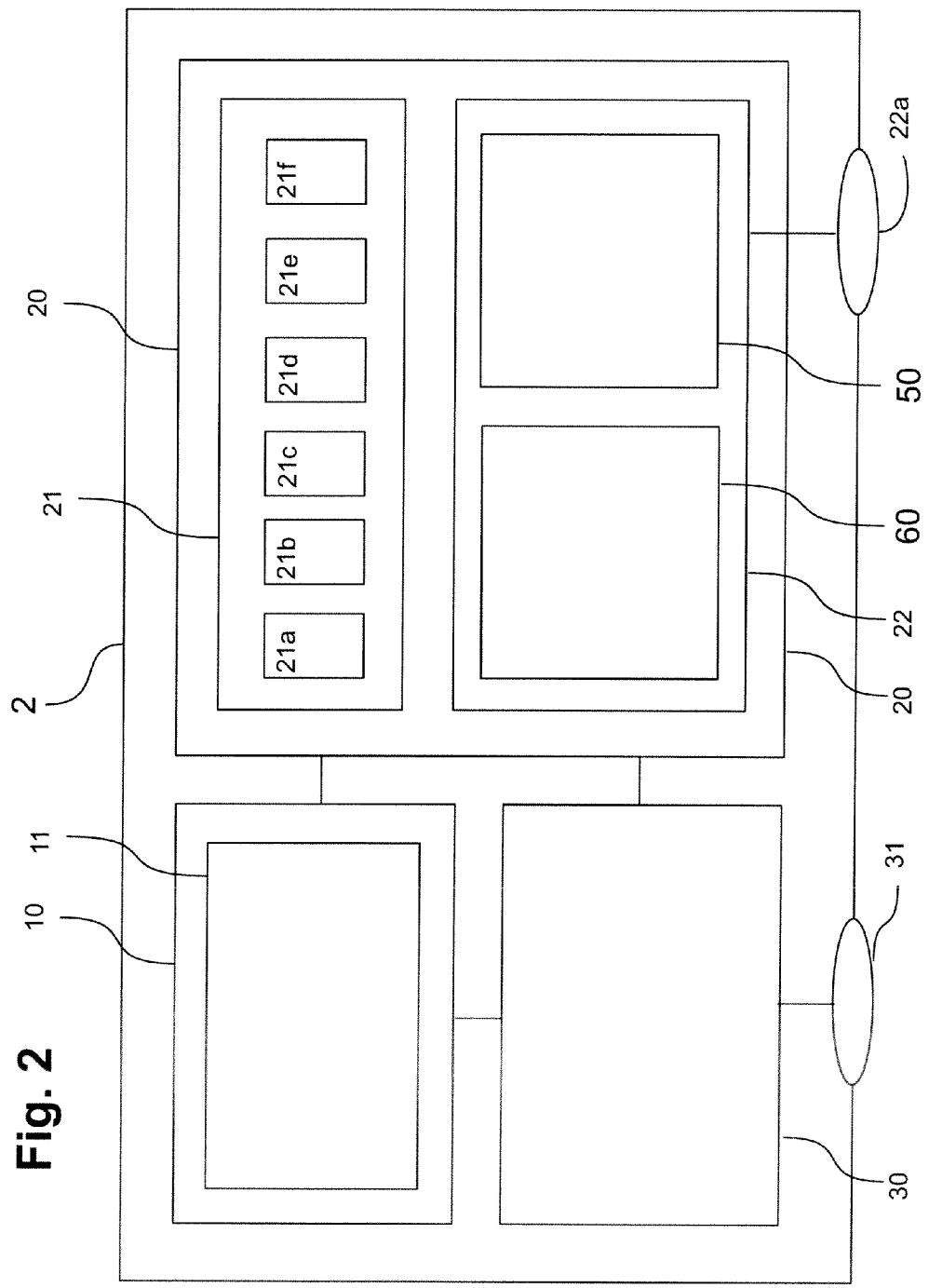
FIG. 2 shows an embodiment of a schematic structure of an operating device.

FIG. 2 shows a schematic structure of an embodiment of an operating device 2. The operating device 2 comprises the display apparatus 10 already shown in FIG. 1 including the screen 11 for displaying a graphic user interface for controlling and supervising machine functions of the machine 1 and the operating apparatus 20 for is inputting command-triggering operating actions for controlling machine functions of the machine 1 and functions of the graphic user interface by an operator of the machine 1. The operating apparatus 20 comprises a first input apparatus 21 for inputting manual operating actions. For this purpose, the input apparatus 21 comprises a plurality of operating elements 21a to 21f that can be directly and manually operated, such as keys of an alphanumerical keyboard, a computer mouse, a touchscreen (optionally in connection with the screen 11), soft keys, control dials, switches, buttons, etc.

Furthermore, the operating device 2 comprises a controller 30 for implementing command-triggering operating actions, which have been input into the operating apparatus 20 by the operator, into associated control commands for controlling machine functions of the machine 1 and functions of the graphic user interface by the operator which then can be transmitted to the machine tool 1 via an interface 31, e.g. to the CNC control of the machine 1 or optionally to the PLC control or the emergency stop circuit of the machine 1.

In addition to the first input apparatus 21 for inputting manual operating actions, the operating apparatus 20 further comprises a second input apparatus 22 for inputting contact-free operating actions with a sensor system 50 for detecting contact-free actions of the operator and a detecting apparatus 60 for detecting a command-triggering operating action of the operator by using the contact-free actions of the operator detected by the sensor system 50. In this case the sensor system 50 is adapted to optically and/or acoustically detect contact-free operating actions of the operator (e.g. by means of cameras and/or microphones). The detecting apparatus 60 is adapted to detect the contact-free actions of the operator detected optically or acoustically by the sensor system 50 by means of electronic image processing methods for optical signals and/or processing means for acoustic signals, such as electronic voice recognition, and identify them as predefined contact-free operating actions, respectively, the predefined contact-free operating actions being associated with certain control or operating commands which are transmitted to the machine tool 1 or realized by way of the controller 30 after the respective operating action has been recognized by the detecting apparatus 60.

Moreover, the operating device 2 comprises a data interface 22a (e.g. USB interface, CD or disc drive, RFID interface etc.) via which the user-specific calibration data for the second input apparatus 22 may be imported, e.g. within the frame of a log-on procedure of the operator at the machine tool 1, which may also be used for unlocking an authorization grade of the operator when starting the machine 1, whereby the operator is logged on and by using his or her authorization grade certain machine functions may be unlocked or locked for the operator depending on the authorization grade. The second input apparatus 22 for the contact-free input of operating commands is adapted to be calibrated to a respective operator in a person-related manner. The calibration to the operator may then be performed based on the imported personal-related calibration data. Such calibration data may, for example, comprise a speech pattern associated with the operator for calibrating a voice recognition unit and/or body measurement data associated with the operator for calibrating an image processing unit.

FIG. 3 shows an input apparatus 22 for inputting contact-free operating actions according to a first or second embodiment. The sensor system 50 of the input apparatus 22 in FIG. 3 comprises a camera system 51 including e.g. four cameras 51a to 51d for optically detecting mimic and gestural actions of the operator.

The detecting apparatus 60 of the input apparatus 22 accordingly comprises an image processing unit 61 which is adapted to perform image recognition on the basis of sensor signals of the camera system 51. In particular the cameras 51a to 51d according to the first embodiment are adapted for optically detecting mimic actions of the operator. Alternatively (or additionally) thereto, the cameras 51a to 51d according to the second embodiment are adapted for optically detecting gestural actions of the operator. The image processing unit 61 is adapted to perform three-dimensional image recognition based on sensor signals of the camera system 51 which are detected by at least two of the cameras 51a to 51d.

To this end, four cameras are provided in FIG. 3 because thus the area that is detected by at least two cameras and in which therefore a three-dimensional recognition of the operating action of the operator is possible can be advantageously extended. In case of the recognition of gestures, one camera may already suffice; for three-dimensional image recognition by using the image processing unit 61 that is required for an advantageous recognition of the viewing direction and can achieve substantially better results in the case of gesture recognition, at least two cameras can be used wherein in an another embodiment so many cameras are provided that in the entire range about the machine 1 any possible position of the operator can respectively be detected by at least two cameras.

According to the first embodiment, the camera system 51 is adapted to optically detect the eyes or pupils of the operator, the image processing unit 61 being adapted to recognize a viewing direction of the operator based on optically detected pupils of the eyes of the operator. This may be used, for example, for controlling the graphic user interface of the operating device 2 by the fact that the image processing unit 61 is adapted to detect a viewing position of the operator on the graphic user interface based on the detected viewing direction.

Then, the controller 30 may be adapted to select screen portions of the graphic user interface on the basis of the detected viewing position of the operator on the screen 11, to activate interactive elements of the graphic user interfaced based on the detected viewing position of the operator on the screen 11, to switch between the display of a plurality of screen masks of the graphic user interface on the basis of the detected viewing position of the operator on the screen 11 or also to reduce or to enlarge these screen masks of the graphic user interface on the display or to scroll in them. This application may be further improved in machine 1 if the image processing unit 61 is adapted to detect a viewing position of the operator on components of the machine 1 in the machining space 1a based on the recognized viewing direction. In a particularly suitable manner, based on the detected viewing position of the operator on a component of the machine 1, the controller 30 may be adapted to display information or control masks associated with the component on the graphic user interface. Then the operator does not have to manually select or activate said component deliberately.

If the camera system 51 is adapted to detect the eyes or pupils of the operator, the image processing unit 61 can be adapted to recognize an eyelid movement of the operator based on optically detected eyes of the operator. Then, the detecting apparatus 60 is preferably adapted to detect an eyelid movement pattern based on detected eyelid movements wherein an eyelid movement pattern may comprise a number of eyelid movements and the time intervals between eyelid movements. The controller 30 may then be adapted to associate a detected predetermined eyelid movement pattern comprising a predetermined number of eyelid movements in a predetermined time interval with a confirmation or rejection control command for confirming or rejecting a contact-free operating action.

A design of the operating device 2 according to the first embodiment which involves a considerable improvement of the safety on the machine tool 1 may be provided by the image processing unit 61 being adapted to detect a change of the eye or pupil size in the eyes of the operator, and the controller 30 being adapted to trigger an emergency stop on the machine 1 if an abrupt eye or pupil enlargement of an operator is detected and a viewing direction of the operator is recognized as facing the machining space 1a of the machine 1. Namely, in this case it may be assumed that the abrupt eye or pupil enlargement is a reflexive reaction to a shock of the operator due to the optical recognition of a dangerous situation in the machining space 1a of the machine 1 wherein an immediate emergency stop may be triggered at the machine 1 without a delay due to awaiting the reaction time of the operator.

According to the second embodiment, the camera system 51 is adapted to optically detect the hands or arms of the operator, the image processing unit 61 being adapted to recognize a manual gestural action of the operator. Accordingly, the image processing unit 61 is adapted to detect gestural commands of a plurality of predefined gestural commands, each predefined gestural command being associated with a particular command-triggering operating action. Thus, the operator may carry out control or operating commands in a simple and contact-free manner by using simple predefined gestures (particularly hand gestures).

FIG. 4 shows an input apparatus 22 for inputting contact-free operating actions according to a third embodiment. The sensor system 50 of the input apparatus 22 in this case comprises a microphone system 52 for detecting acoustic actions of the operator, which comprises two microphones 52a and 52b. Although one microphone 52a is sufficient for acoustic detection, however, the second microphone 52b (or further microphones, if necessary) may be disposed such that the range for detecting acoustic actions of the operator can be extended, or moreover position information regarding the location of the operator may be calculated in case of a plurality of microphones due to the time delay between the reception of the signal at the microphones 52a and 52b (and any other microphones) depending on the position of the operator during the acoustic action.

In FIG. 4 the detecting apparatus 60 comprises a voice recognition unit 62 for recognizing voice inputs of the operator detected by the microphone system 52. The voice recognition unit 62 is adapted to recognize voice commands of the operator from a plurality of predefined voice commands, each predefined voice command being associated with a particular command-triggering operating action. Thus, according to the third embodiment, the operator can give corresponding control commands by means of acoustic voice commands (e.g. by using simple voice commands such as "YES", "NO", "OK", "STOP", "EMERGENCY STOP", and the like) which can then be recognized at the input apparatus 22 and implemented by the controller 30.

Here, the voice recognition unit 62 according to this embodiment is adapted to detect a speech pattern of a voice command detected by means of the microphone system 52, and the controller 30 is furthermore adapted to log on an operator having an associated stored speech pattern to the machine 1 and carry out only detected voice commands that have a detected speech pattern corresponding to the speech pattern associated with the logged-on operator. In this case, the speech pattern may be made e.g. during calibration by using the data interface 22a. Thus, it is advantageously possible to prevent that voice commands of an operator at an adjacent machine 1 whose voice commands have the wrong speech pattern will erroneously be used for controlling the machine 1 because only voice commands with the speech pattern of the logged-on operator are carried out or implemented by the controller 30.

A particularly suitable design of the operating device 2 according to the third embodiment that involves a considerable improvement of the safety of machine 1 can be provided by adapting the detecting apparatus 60 to detect a shout or scream of an operator and the loudness thereof detected by the microphone system 52. Then, the controller 60 can be adapted to immediately and automatically trigger an emergency stop at the machine 1 if a shout or scream of the operator having a higher loudness than a predetermined loudness limit value is detected by the detecting apparatus 60.

Above, various embodiments have been described. The features of the above-described embodiments, in particular of the first, second, and third embodiment, and also the modifications thereof can be used individually and arbitrarily combined with each other. The operability of the machine in case of combinations in a synergistic manner can be designed to be more flexible, intuitive, efficient and safer if various contact-free operating possibilities are combined. If the operator wants to forgo one or more of the contact-free operating possibilities due to personal preferences, provision may of course be made to temporarily deactivate one or more of the contact-free operating possibilities individually or also in combination. Thus, it can be ensured that the operator may choose whether to use acoustically detectable contact-free operating possibilities (e.g. based on the possibility to activate or deactivate the voice recognition) and/or whether to use optically detectable operating possibilities (e.g. based on the possibility to activate or deactivate image processing, recognition of viewing direction, viewing position recognition and/or gesture recognition).

In summary, the disclosed embodiments make it possible in an extremely advantageous manner to extend the operability of an automated machine for handling, assembling or machining workpieces, such as a numerically controlled machine tool, and make it more efficient, flexible, intuitive and also safer by providing, in addition to the conventionally known direct manual operating possibilities by touching operating elements on an operating device of the machine further operating possibilities that enable the operator of the machine to trigger operating or control commands at the machine by contact-free operating actions.

REFERENCE NUMERALS machine tool 1
operating device 2
display apparatus 10
screen 11
operating apparatus 20
first input apparatus 21 (for manual input)
operating elements 21a, 21b, 21c, 21d, 21e, 21f
second input apparatus 22 (for contact-free input)
data interface 22a
controller 30
interface 31
sensor system 50
camera system 51
camera 51a, 51b, 51c, 51d
microphone system 52
microphone 52a, 52b
detecting apparatus 60
image processing unit 61
voice recognition unit 62

The invention claimed is:

1. A device for operating an automated machine for handling, assembling or machining workpieces, the device comprising:
   a display apparatus having a screen for displaying a graphic user interface for controlling and/or monitoring machine functions of the machine;
   an operating apparatus for inputting command-triggering operating actions for controlling machine functions of the machine and/or of functions of the graphic user interface by an operator of the machine, comprising a first input apparatus for inputting manual operating actions and a second input apparatus for inputting contact-free operating actions, wherein the second apparatus for inputting contact-free operating actions comprises:
   a sensor system for detecting contact-free actions of the operator,
   a detecting apparatus for detecting a command-triggering operating action of the operator by means of the contact-free actions of the operator detected by the sensor system, and
   a controller for implementing command-triggering operating actions input manually or in a contact-free manner into associated control commands for controlling machine functions of the machine and/or of functions of the graphic user interface by the operator;
   wherein the sensor system has a camera system including at least two cameras disposed spaced apart from one another for optically detecting mimic and gestural actions of the operator and an image processing unit adapted to perform a three-dimensional image recognition based on sensor signals of the camera system; and
   wherein the sensor system is adapted to optically capture the eyes of the operator and to detect a change of the size of the eye or pupil in the eyes of the operator, the controller being adapted to trigger an emergency stop on the machine if an abrupt eye or pupil enlargement of an operator is detected.

2. The device of claim 1 wherein the camera system is adapted to optically capture the hands of an operator, the image processing unit being adapted to detect a manual gestural action of the operator.

3. The device of claim 2 wherein the image processing unit is adapted to recognize gestural commands of a plurality of predefined gestural commands, each predefined gestural command being associated with a particular command triggering operating action.

4. The device of claim 1 wherein the second input apparatus for the contact-free input of operating commands is adapted to be calibrated to a respective operator in a person-related manner, the second input apparatus having a data interface for importing person-related calibration data so that the calibration to the operator is performed based on the person-related calibration data; and the calibration data comprise a speech pattern associated with the operator for calibrating a voice recognition unit.

5. A device for operating an automated machine for handling, assembling or machining workpieces, the device comprising:
   a display apparatus having a screen for displaying a graphic user interface for controlling and/or monitoring machine functions of the machine;
   an operating apparatus for inputting command-triggering operating actions for controlling machine functions of the machine and/or of functions of the graphic user interface by an operator of the machine, comprising a first input apparatus for inputting manual operating actions and a second input apparatus for inputting contact-free operating actions, wherein the second apparatus for inputting contact-free operating actions comprises:
   a sensor system for detecting contact-free actions of the operator,
   a detecting apparatus for detecting a command-triggering operating action of the operator by means of the contact-free actions of the operator detected by the sensor system, and
   a controller for implementing command-triggering operating actions input manually or in a contact-free manner into associated control commands for controlling machine functions of the machine and/or of functions of the graphic user interface by the operator;
   wherein the sensor system has a camera system including at least two cameras disposed spaced apart from one another for optically detecting mimic and gestural actions of the operator and an image processing unit adapted to perform a three-dimensional image recognition based on sensor signals of the camera system;
   wherein the sensor system is adapted to optically capture the eyes of the operator, the image processing unit being adapted to recognize a viewing direction of the operator based on optically captured pupils of the eyes of the operator; and
   wherein the image processing unit is adapted to detect a change of the size of the eye or pupil in the eyes of the operator, the controller being adapted to trigger an emergency stop on the machine if an abrupt eye or pupil enlargement of an operator is detected and a viewing direction of the operator is recognized as facing the machining space of the machine.

6. The device of claim 5 wherein the image processing unit is adapted to detect a viewing position of the operator on the graphic user interface based on the recognized viewing direction.

7. The device of claim 6 wherein the controller is adapted to select screen portions of the graphic user interface based on the detected viewing direction of the operator on the screen.

8. The device of claim 6 wherein the controller is adapted to activate interactive elements of the graphic user interface based on the detected viewing direction of the operator on the screen.

9. The device of claim 6 wherein the controller is adapted to switch between the display of a plurality of screen masks of the graphic user interface based on the detected viewing position of the operator on the screen.

10. The device of claim 5 wherein the image processing unit is adapted to detect a viewing position of the operator on components of the machine in the machining space based on the recognized viewing direction.

11. The device of claim 10 wherein the controller is adapted to display information or control masks associated with a component on the graphic user interface based on the detected viewing position of the operator on said component of the machine.

12. A device for operating an automated machine for handling, assembling or machining workpieces, the device comprising:
   a display apparatus having a screen for displaying a graphic user interface for controlling and/or monitoring machine functions of the machine;
   an operating apparatus for inputting command-triggering operating actions for controlling machine functions of the machine and/or of functions of the graphic user interface by an operator of the machine, comprising a first input apparatus for inputting manual operating actions and a second input apparatus for inputting contact-free operating actions, wherein the second apparatus for inputting contact-free operating actions comprises:

a sensor system for detecting contact-free actions of the operator, a detecting apparatus for detecting a command-triggering operating action of the operator by means of the contact-free actions of the operator detected by the sensor system, and a controller for implementing command-triggering operating actions input manually or in a contact-free manner into associated control commands for controlling machine functions of the machine and/or of functions of the graphic user interface by the operator;

wherein the sensor system has a camera system including at least one camera for optically detecting mimic and gestural actions of the operator, the detecting apparatus comprising an image processing unit adapted to perform an image recognition based on sensor signals of the camera system;

wherein the camera system is adapted to optically capture the eyes of the operator the image processing unit is adapted to recognize an eyelid movement of the operator based on the optically captured eyes of the operator; and wherein the detecting apparatus is adapted to detect an eyelid movement pattern on the basis of detected eyelid movements, an eyelid movement pattern comprising a number of eyelid movements and time intervals between eyelid movements, the controller being adapted to allocate a detected predetermined eyelid movement pattern with a predetermined number of eyelid movements in a predetermined time interval to a confirmation control command for confirming a contact-free operating action.

13. A device for operating an automated machine for handling, assembling or machining workpieces, the device comprising:

a display apparatus having a screen for displaying a graphic user interface for controlling and/or monitoring machine functions of the machine;

an operating apparatus for inputting command-triggering operating actions for controlling machine functions of the machine and/or of functions of the graphic user interface by an operator of the machine, comprising a first input apparatus for inputting manual operating actions and a second input apparatus for inputting contact-free operating actions, wherein the second apparatus for inputting contact-free operating actions comprises:

a sensor system for detecting contact-free actions of the operator, a detecting apparatus for detecting a command-triggering operating action of the operator by means of the contact-free actions of the operator detected by the sensor system, and a controller for implementing command-triggering operating actions input manually or in a contact-free manner into associated control commands for controlling machine functions of the machine and/or of functions of the graphic user interface by the operator;

wherein the sensor system has a microphone system for picking up acoustic actions of the operator; and wherein the detecting apparatus is adapted to detect a shout or scream of the operator and the loudness thereof captured by the microphone system, the controller being adapted to trigger an emergency stop on the machine if a shout or scream of the operator with a loudness greater than a predetermined loudness limit value is detected by the detecting apparatus.

14. The device of claim 13 wherein the detecting apparatus has a voice recognition unit for recognizing speech input of the operator detected by the microphone system.

15. The device of claim 14 wherein the voice recognition unit is adapted to recognize voice commands of the operator from a plurality of predefined voice commands, each predefined voice command being associated with a particular command-triggering operating action.

16. The device of claim 14 wherein the voice recognition unit is adapted to detect a speech pattern of a voice command picked up by using the microphone system, the controller being adapted to log on an operator with an associated stored speech pattern to the machine and perform only picked-up voice commands that have a detected speech pattern corresponding to the speech pattern associated with the logged-on operator.

17. The device of claim 13 wherein the second input apparatus for the contact-free input of operating commands is adapted to be calibrated to a respective operator in a person-related manner, the second input apparatus having a data interface for importing person-related calibration data so that the calibration to the operator is performed based on the person-related calibration data; and the calibration data comprise body measurement data associated with the operator for calibrating an image processing unit.

\* \* \* \* \*